(12) United States Patent
Jones et al.

(10) Patent No.: US 11,125,921 B2
(45) Date of Patent: Sep. 21, 2021

(54) REFLECTIVE STACK WITH HEAT SPREADING LAYER

(71) Applicant: 3M INNOVATIVE PROPERTIES COMPANY, St. Paul, MN (US)

(72) Inventors: Clinton L. Jones, Somerset, WI (US); Jeremy O. Swanson, Woodbury, MN (US); Brian A. Kinder, Woodbury, MN (US); Sara Jouzdani, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 645 days.

(21) Appl. No.: 15/747,404

(22) PCT Filed: Jul. 21, 2016

(86) PCT No.: PCT/US2016/043341
§ 371 (c)(1),
(2) Date: Jan. 24, 2018

(87) PCT Pub. No.: WO2017/019450
PCT Pub. Date: Feb. 2, 2017

(65) Prior Publication Data
US 2018/0372931 A1 Dec. 27, 2018

Related U.S. Application Data

(60) Provisional application No. 62/196,649, filed on Jul. 24, 2015.

(51) Int. Cl.
*G02B 5/08* (2006.01)
*B32B 27/06* (2006.01)
*F28F 3/08* (2006.01)

(52) U.S. Cl.
CPC ............ *G02B 5/0841* (2013.01); *B32B 27/06* (2013.01); *F28F 3/08* (2013.01)

(58) Field of Classification Search
CPC ......... G02F 1/133385; G02F 1/133605; G02B 5/0841; G02B 5/0816; F28F 3/08;
(Continued)

(56) References Cited

U.S. PATENT DOCUMENTS 3,610,729 A 10/1971 Rogers
4,446,305 A 5/1984 Rogers
(Continued)

FOREIGN PATENT DOCUMENTS

CN 203748176 7/2014
JP 2003-270407 9/2003
(Continued)

OTHER PUBLICATIONS

Weber, "Giant Birefringent Optics in Multilayer Polymer Mirrors", Science, Mar. 2000, vol. 287, pp. 2451-2456.
(Continued)

*Primary Examiner* — Catherine A. Simone
(74) *Attorney, Agent, or Firm* — Michael Stern (57) ABSTRACT

Reflective stacks including heat spreading layers (320) are described. In particular, reflective stacks including polymeric multilayer reflectors (330). Heat spreading layers (320) may include natural or synthetic graphite or copper.

18 Claims, 2 Drawing Sheets

(58) Field of Classification Search
CPC . F28F 21/02; B32B 27/06; B32B 3/26; B32B 3/30

See application file for complete search history.

(56) References Cited

U.S. PATENT DOCUMENTS

| | | |
|---|---|---|
| 4,540,623 A | 9/1985 | Im |
| 5,103,337 A | 4/1992 | Schrenk |
| 5,360,659 A | 11/1994 | Arends |
| 5,448,404 A | 9/1995 | Schrenk |
| 5,882,774 A | 3/1999 | Jonza |
| 6,157,490 A | 12/2000 | Wheatley |
| 6,531,230 B1 | 3/2003 | Weber |
| 6,982,874 B2 | 1/2006 | Smalc |
| 7,104,776 B2 | 9/2006 | Merrill |
| 7,166,912 B2 | 1/2007 | Tzeng |
| 8,563,104 B1 | 10/2013 | Rappoport |
| 10,120,208 B2 | 11/2018 | Ma |
| 2006/0093825 A1 | 5/2006 | Lee |
| 2007/0047080 A1 | 3/2007 | Stover |
| 2009/0067132 A1* | 3/2009 | Lemak .................. H01L 23/373 361/708 |
| 2009/0123668 A1 | 5/2009 | Hebrink |
| 2009/0303411 A1* | 12/2009 | Kawato ............ B29D 11/00605 349/61 |
| 2011/0102891 A1 | 5/2011 | Derks |
| 2011/0169393 A1 | 7/2011 | Gyoda |
| 2011/0169724 A1 | 7/2011 | Tao |
| 2013/0260081 A1 | 10/2013 | Rappoport |

FOREIGN PATENT DOCUMENTS

| | | |
|---|---|---|
| JP | 2004-101693 | 4/2004 |
| JP | 2007-279145 | 10/2007 |
| JP | 2008-155592 | 7/2008 |
| JP | 2009-210731 | 9/2009 |
| JP | 2013-133368 | 7/2013 |
| KR | 2007-0062137 | 6/2007 |
| KR | 2007-0119371 | 12/2007 |
| WO | WO 1995-017303 | 6/1995 |
| WO | WO 1999-039224 | 8/1999 |
| WO | WO 2001-026891 | 4/2001 |
| WO | WO 2007-002341 | 1/2007 |
| WO | WO 2012-090949 | 5/2012 |
| WO | WO 2012-075352 | 6/2012 |
| WO | WO 2015/099145 A1 | 7/2015 |

OTHER PUBLICATIONS

International Search Report for PCT International Application No. PCT/US2016/043341, dated Feb. 15, 2017, 7 pages.

* cited by examiner

REFLECTIVE STACK WITH HEAT SPREADING LAYER

BACKGROUND

Backlights for display devices are sometimes exposed to uneven and significant sources of heat. Sometimes the heat is from components internal to the device and sometimes it is from an external source. Reflectors are used in displays to minimize absorptive losses and to improve the gain of the displays in conjunction with recycling films like prism films and reflective polarizers. Conductive metals and carbon (graphite) are used to conduct and spread heat.

SUMMARY

In one aspect, the present disclosure relates to a reflective stack. The reflective stack includes first polymeric multilayer reflector having a major surface, a heat spreading layer disposed on the major surface of the polymeric multilayer reflector, and a second polymeric multilayer reflector disposed on the heat spreading layer opposite the first polymeric multilayer reflector. The first polymeric multilayer reflector has a first thickness and the second polymeric multilayer reflector has a second thickness, and the first thickness and the second thickness are within 5% of each other.

In another aspect, the present disclosure relates to a reflective stack. The reflective stack includes a polymeric multilayer reflector having a major surface, a heat spreading layer having at least one edge, the heat spreading layer disposed on the major surface of the polymeric multilayer reflector, and a polymeric film disposed on the heat spreading layer opposite the polymeric multilayer reflector. The polymeric multilayer reflector and the polymeric film are larger than the heat spreading layer such that, from a plan view, there is at least a 0.1 mm border along a portion of the at least one edge that includes the polymeric multilayer reflector and the polymeric film but no heat spreading layer, and the polymeric film is adhered directly to the polymeric multilayer reflector at the border.

In yet another aspect, the present disclosure relates to a reflective stack. The reflective stack includes a polymeric multilayer reflector having a major surface, a first polymeric film disposed on the major surface of the polymeric multilayer reflector, a heat spreading layer having at least one edge, the heat spreading layer disposed on first polymeric film opposite the polymeric multilayer reflector, and a second polymeric film disposed on the heat spreading layer opposite the polymeric multilayer reflector. The polymeric multilayer reflector and the second polymeric film are larger than the heat spreading layer such that, from a plan view, there is at least a 0.1 mm border along a portion of the at least one edge that includes the polymeric multilayer reflector and the polymeric film but no heat spreading layer, and the second polymeric film is adhered directly to the polymeric multilayer reflector at the border.

DETAILED DESCRIPTION

Backlights for displays for devices require the simultaneous powering of several different components. In some cases, the powering of these components results in localized heat generation which may cause accelerated or non-uniform wear of components, such as microprocessors, batteries, or other electronics. In some cases, the localized heat generation may make a device uncomfortable to hold if it is handheld or portable, may damage proximate heat sensitive components, may melt or deform parts with poor thermal performance, and may shorten the useful lifetime of certain components. In some embodiments, it may be desirable to spread the heat generated by such components over a larger surface area.

Figure 1:
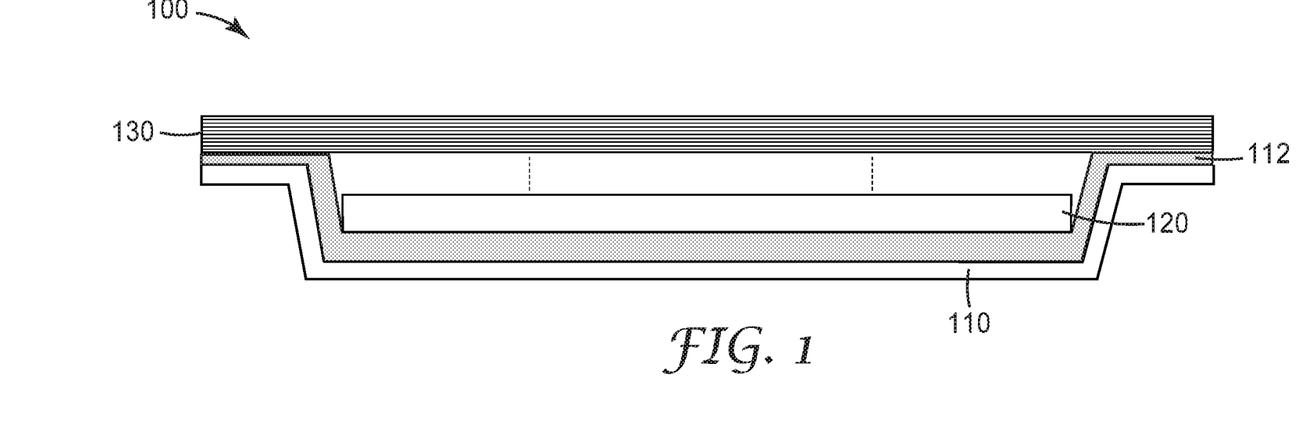
FIG. 1 is an elevation cross-section of a reflective stack.

FIG. 1 is an elevation cross-section of a reflective stack. Reflective stack 100 includes polymeric film 110, adhesive 112, heat spreading layer 120, and polymeric multilayer reflector 130.

Polymeric multilayer reflector 130 may be any suitable size and shape, including any suitable thickness. Polymeric multilayer reflectors, such as Enhanced Specular Reflector (ESR) (available from 3M Co., St. Paul, Minn.) are known and such films are commercially available.

Multilayer optical films, including multilayer reflectors have been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. These may also be referred to as thermoplastic multilayer optical films. Such films are compatible with high volume manufacturing processes and can be made in large sheets and roll goods. The description and examples below relate to thermoplastic multilayer optical films.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film. Multilayer optical films may also include additional optical coatings or layers (such as prisms, diffusers, or the like) or non-optical layers for dimensional stability, warp resistance, impact protection, or the like.

In some cases, the microlayers have thicknesses and refractive index values providing a ¼-wave stack, i.e., arranged in optical repeat units or unit cells each having two adjacent microlayers of equal optical thickness (f-ratio=50%), such optical repeat unit being effective to reflect by constructive interference light whose wavelength λ is about twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients of the optical repeat units along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

In many applications, the reflection properties of a reflector may be characterized in terms of "hemispheric reflectivity," $R_{hemi}(\lambda)$, meaning the total reflectivity of a component (whether a surface, film, or collection of films) when light (of a certain wavelength or wavelength range of interest) is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}(\lambda)$. Characterizing a reflector in terms of its $R_{hemi}(\lambda)$ may be especially convenient for backlight recycling cavities because light is often incident on the internal surfaces of the cavity—whether the front reflector, back reflector, or side reflectors—at all angles. Further, unlike the reflectivity for normal incident light, $R_{hemi}(\lambda)$ is insensitive to, and already takes into account, the variability of reflectivity with incidence angle, which may be very significant for some components within a recycling backlight (e.g., prismatic films).

It is understood that for numerous electronic display applications using backlights, and that for backlights for general and specialty lighting applications, it may be desirable for the reflector film forming the backlight's backplane to have high reflectivity characteristics. Indeed, it is further understood that the hemispheric reflectivity spectrum, $R_{hemi}(\lambda)$, strongly correlates with light output efficiency of a backlight; the higher the $R_{hemi}(\lambda)$ value across the visible light spectrum, the higher the output efficiency of the backlight. This is particularly true for recycling backlights, where other optical films may be configured over the backlight exit aperture to provide collimated or polarized light output from the backlight.

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present description, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, sometimes followed by passing the multilayer extrudate through one or more multiplication die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index $(\Delta n_x)$ for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index $(\Delta n_y)$ for light polarized along the y-axis of at least 0.05.

Polymeric multilayer optical films as described herein may be highly reflective; for example, they may reflect more than 95% or 99% or even 99.5% of visible light, as measured at normal incidence. Visible light may be characterized as wavelengths between 400 nm and 700 nm, or in some cases between 420 nm and 700 nm. Further, polymeric multilayer optical films as described herein may be thin—in some cases, thinner than 100 μm, 85 μm, or 65 μm, 50 μm, 35 μm, or even 32 μm. In embodiments where the polymeric multilayer optical film includes a third optical packet, the film may be thinner than 165 μm.

Skin layers are sometimes added which occurs after the feedblock but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.).

Heat spreading layer 120 may be any suitable material and may be any suitable size and shape. In some embodiments, heat spreading layer 120 is undersized compared to polymeric multilayer reflector 130. Heat spreading layer 120 may be formed from conductive metals, such as copper or silver, or it may be formed from other suitable materials such as ceramics like boron nitride. Other heat spreading layer options include synthetic and natural graphite. Isotropic heat spreading materials may be used in some embodiments, and in some embodiments, anisotropic materials may be desired. Anisotropic materials may, for example, be very conductive in the X- and Y-directions (i.e., in plane) but not very conductive in the Z-direction. In some embodiments, heat spreading layer 120 includes multiple layers of heat spreading material. Heat spreading layer 120 may have any suitable thickness: in some embodiments, heat spreading layer 120 is thinner than 50 µm, or thinner than 30 µm. Heat spreading layer 120 may be a twentieth the area of polymeric multilayer reflector 130, a tenth, eighth, sixth, fifth, third, half, two-thirds, three-quarters, or even 90%, 95%, or 99% the area of polymeric multilayer reflector 130. In some embodiments, heat spreading layer 120 may be mostly a regular shape, such as a rectangular or square, but may include one or more tabs.

Heat spreading layer 120 is disposed on, but not adhered to polymeric multilayer reflector 120. This is signified by the dashed lines connecting heat spreading layer 120 to polymeric multilayer reflector 130.

Polymeric film 110 is adhered to heat spreading layer 120 and polymeric multilayer reflector 120 via adhesive 112. Adhesive 112 may be any suitable adhesive and have any suitable thickness. Adhesive 112 is viscous enough so that it does not flow around and fill the space between heat spreading layer 120 and polymeric multilayer reflector 130. In other words, adhesive 112 joins protective layer 110 and heat spreading layer 120, and protective layer 110 and polymeric multilayer reflector 130, but not heat spreading layer 120 and polymeric multilayer reflector 120. In some embodiments, adhesive 112 may be a pressure sensitive adhesive. In some embodiments, adhesive 112 may be a UV curable adhesive. In some embodiments, adhesive 112 is a hot melt adhesive.

Polymeric film "edge seals" heat spreading layer 120. Accordingly, polymeric film 110 is oversized compared to heat spreading layer 120. In some embodiments, polymeric film 120 is adhered to polymeric multilayer reflector 130 directly via adhesive 112, without heat spreading layer 120 in between. FIG. 1 is merely a cross-section, and therefore shows that heat spreading layer 120 is edge sealed only along two edges. In some embodiments, heat spreading layer 120 is edge sealed along three edges, along four edges, or more, depending on the overall shape of heat spreading layer 120. In some embodiments, heat spreading layer 120 has one or more tabs and these tabs extend beyond polymeric film 110. Polymeric film 110 may be any suitable shape and thickness as well, and, despite its illustration in FIG. 1 as being sharply bent at the edges, may have any number of curved or straight parts. In some embodiments, polymeric film 110 may be scored to provide for easier bending. In some embodiments, polymeric film 110 is larger than both heat spreading layer 120 and polymeric multilayer reflector 130 such that when heat spreading layer 120 is edge sealed, there is, from a plan view, an exposed portion of polymeric film 110 extending beyond the polymeric multilayer reflector. In some embodiments, the polymeric film may be a continuous roll and the polymeric multilayer reflector and/or the heat spreading layer may be discontinuously arranged, such that the polymeric film may be wound as a roll with a plurality of discontinuous reflective stacks disposed thereon.

Polymeric film 110 may be any suitable material. In some embodiments, polymeric film 110 may be a polymeric material, such as polyethylene terephthalate (PET), polyethylene naphthalate (PEN), poly(methyl methacrylate) (PMMA), or polycarbonate (PC). In some embodiments, polymeric film 110 may be a polymeric multilayer reflector. In some embodiments, polymeric film 110 may be a polymeric multilayer reflector with the same thickness and the same configuration as polymeric multilayer reflector 130. In some embodiments, polymeric film 110 is a polymeric multilayer reflector that has a thickness that is within 10%, or within 5% of the thickness of polymeric multilayer reflector 130.

The direct interface between heat spreading layer 120 and polymeric multilayer reflector 130 may be beneficial from the standpoint of promoting better heat spreading, as there are no intervening layers. At the same time, the edge sealing of heat spreading layer 120 by polymeric film 110 prevents contamination of other device electronics or components as certain heat spreading layer materials, such as graphite, tend to shed or lose material over time, and this material can migrate into the electronics or components.

Polymeric film 110 may be, however, perforated or have at least one hole or punchout. This punchout may be through heat spreading layer 120 as well. Likewise, polymeric multilayer reflector 130 may also be perforated or have at least one hole or punchout. This may help with thermal expansion and overall weight, and may also help with radio frequency transparency. Suitable balances between perforation and contamination prevention may be determined by the specific application.

Figure 2:
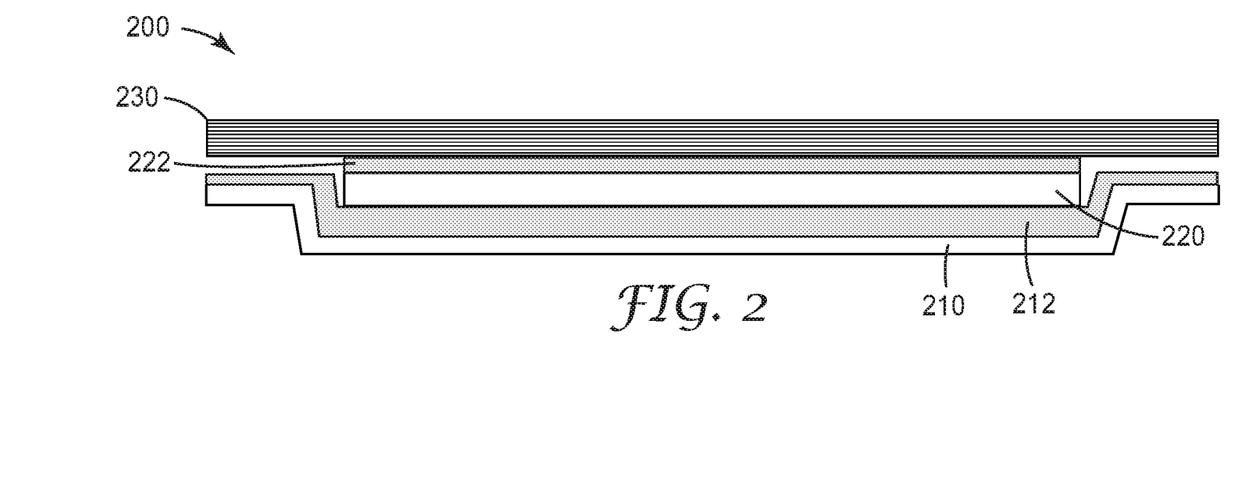
FIG. 2 is an elevation cross-section of another reflective stack.

FIG. 2 is an elevation cross-section of another reflective stack. Reflective stack 200 includes polymeric film 210, first adhesive 212, heat spreading layer 220, second adhesive 222, and polymeric multilayer reflector 230. Reflective stack 200 of FIG. 2 is similar to reflective stack 100 of FIG. 1 except heat spreading layer 220 is adhered to polymeric multilayer reflector 230 with second adhesive 222 as well as being edge sealed by polymeric film 210 via first adhesive 212.

Figure 3:
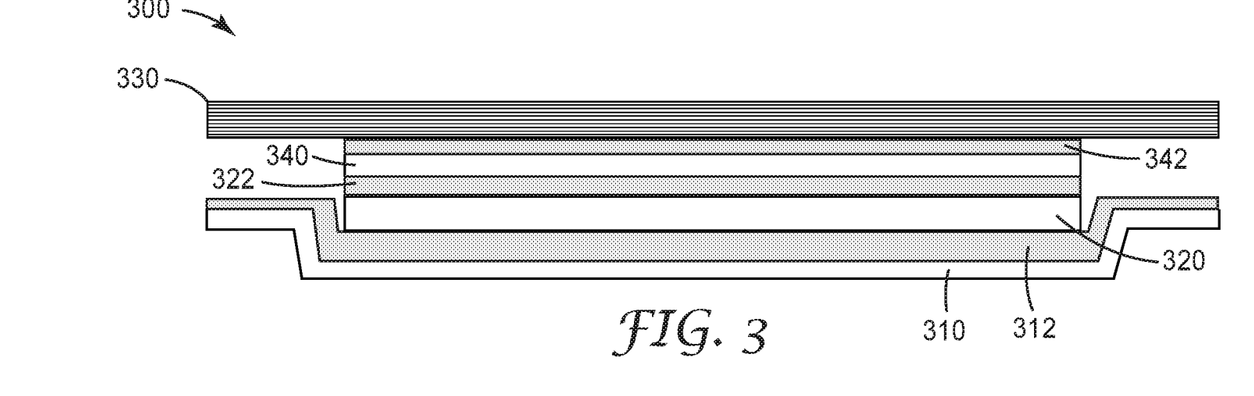
FIG. 3 is an elevation cross-section of another reflective stack.

FIG. 3 is an elevation cross-section of another reflective stack. Reflective stack 300 includes first polymeric film 310, first adhesive 312, heat spreading layer 320, second adhesive 322, second polymeric film 340, third adhesive 342, and polymeric multilayer reflector 330. Reflective stack 300 is similar to reflective stack 200 of FIG. 2 except the reflective stack further includes a second polymeric film 340 disposed on heat spreading layer 320, and the second polymeric film is adhered to the polymeric multilayer reflector, via third adhesive 342. Second polymeric film 340 is adhered to heat spreading layer 320 via second adhesive 322. Even though heat spreading layer 320 is disposed between first polymeric film 310 and second polymeric film 340, heat spreading layer 320 is not fully enclosed by or sealed between the polymeric films. Second polymeric film 340 may be any suitable polymeric film, and may be similar to or different from first polymeric film 310. In some embodiments, the second polymeric film may be disposed on the opposite side as shown in FIG. 3; that is, first polymeric film 310 is adhered to second polymeric film 340 via first adhesive 312.

Figure 4:
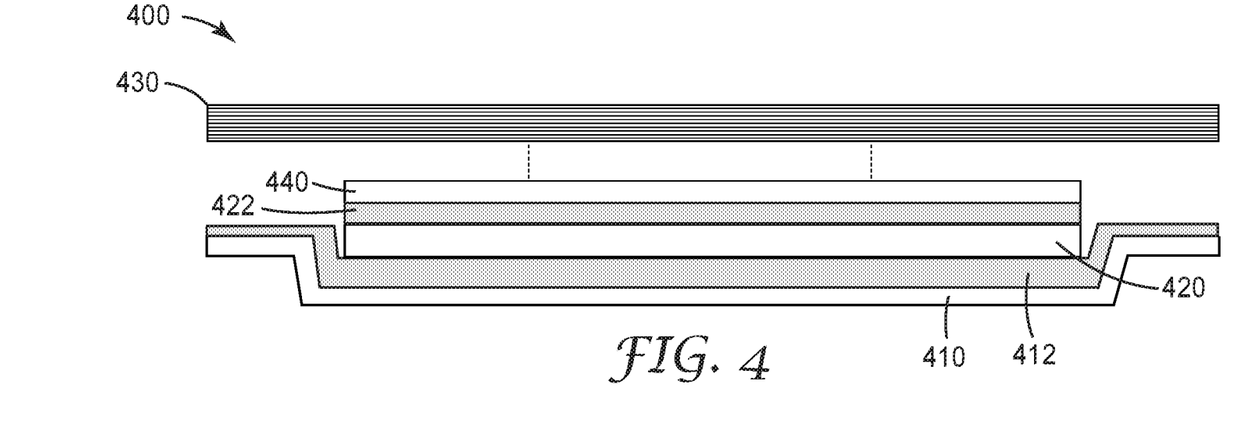
FIG. 4 is an elevation cross-section of another reflective stack.

FIG. 4 is an elevation cross-section of another reflective stack. Reflective stack 400 includes first polymeric film 410, first adhesive 412, heat spreading layer 420, second adhesive 422, second polymeric film 440, and polymeric multilayer reflector 430. Reflective stack 400 is similar to reflective stack 300 of FIG. 3 except second polymeric film 440 is disposed on but not adhered to polymeric multilayer reflector 430. As for reflective stack 300 in FIG. 3, in some embodiments, second polymeric film 440 may be disposed on the opposite side of heat spreading layer 420, such that heat spreading layer 420 may be disposed on but not adhered to polymeric multilayer reflector 430.

Laminated rolls of sealed graphite pouches are described in U.S. Pat. No. 8,563,104 (Rappoport et al.) but describe roll-to-roll processes that require expensive and wasteful conversion, in particular, the necessitation of the disposal of a large percentage of often-expensive multilayer polymeric reflector. Further, Rappoport et al. requires extra material for carrier layers and the pouches of graphite to be fully sealed, as opposed to edge sealing or otherwise not fully sealing the graphite in a pouch. Accordingly, heat spreading, warping, and cosmetic quality from print through may be poorer than the performance of embodiments described herein Embodiments described herein may have one or more advantages over other heat spreading reflective stacks. First, reflective stacks described herein may be very thin and may still provide excellent thermal spreading properties. In some embodiments, they may be thinner than 200 µm, 150 µm, 130 µm, 100 µm, or even 50 µm. Reflective stacks described herein may also resist high heat and/or high humidity exposure or cycling in that they do not permanently curl or deform. Reflective stacks described herein may also help mitigate "print through" effects, where either dents in or surface roughness of the heat spreading layer presses into the polymeric multilayer reflector and causes visible cosmetic defects in the reflector.

EXAMPLES

Samples for these examples were evaluated using the following tests. Three variations of environmental testing were used. The first was a thermal shock (TS) test where the sample was placed in an oven and exposed for 24 hours to cycles of 1 hour at 40 degrees C. alternating with 1 hour at 85 degrees C. A second test was a high temperature (HT) test where the sample placed in a dry oven (at about 3% relative humidity) and exposed to 85 degrees C. for 24 hours. A third test was a high temperature, high humidity (HTHH) test where the sample was placed in an oven and exposed to 65 degrees C. and 95% relative humidity for 24 hours. After the environmental testing, the sample was placed in a chamber for reconditioning at 22 degrees C. and 50% relative humidity.

Each sample was evaluated for edge part curl before environmental testing and after reconditioning. To do this, the rectangular sample was placed on a flat surface and a ruler was used to measure the distances that the edges of the four sides of the sample rose above the flat surface. Average edge part curl was computed as the arithmetic average of the four edge part curl measurements. Change in average edge part curl was the difference between the average edge part curl after reconditioning and the average initial edge part curl.

A visual rating was also assigned to each sample as an assessment of the appearance of the reflective surface after environmental testing. A rating of "excellent" meant that the surface had an acceptable visual appearance with a few small flaws appropriate for low diffusion backlight systems, "good" meant that small flaws were more numerous, and "marginal" meant that the sample had an appearance best suited for high diffusion backlight designs Select samples were also evaluated to determine edge fidelity by how well the graphite sheet was centered on the protective sheet. Using a ruler, the widths of the border were measured on the midpoint of each side of the sample.

Example 1-1

A sample was prepared as follows. Using a rotary converting process a stack of three films was assembled. The bottom film was a 2 micron thick PET protective sheet of dimensions 65 mm by 115 mm with a 5 micron thick transfer adhesive (3M 82600 adhesive from 3M Company, St. Paul Minn.) applied to one side. Next, a 25 micron thick graphite sheet (AvCarb HS-025 available from AvCarb Material Solutions, Lowell Mass.) was positioned on the lower film so that it left about a 1 mm border around the perimeter of the graphite sheet. (The graphite sheet had dimensions approximately 64 mm by 114 mm.) Then a 32 micron thick reflective film (ESR2 from 3M Company, St. Paul Minn.) having the same dimensions as the PET sheet was attached above the graphite film with the reflective side facing away from the graphite film. It was held in place by the adhesive around the border of the graphite film.

Edge part curl of the sample was evaluated before environmental testing and after reconditioning. The environmental test was thermal shock (TS) testing. The visual appearance of the sample was evaluated after reconditioning. Results are recorded in Table 1. The widths of the border were measured to be 0.68, 0.56, 0.70 and 0.84 mm.

Example 1-2

A second sample was made and tested as in Example 1-1. Results are shown in Table 1. Border widths were measured to be 1.63, 0.47, 0.0, and 0.96 mm.

Example 1-3

A sample was made as in Example 1-1. The environmental testing was high temperature (HT) testing. Edge part curl was measured before environmental testing and following reconditioning. Visual appearance was also evaluated after reconditioning. Results are reported in Table 1. Border widths were measured to be 1.51, 0.91, 0.35, and 0.62 mm.

Example 1-4

Another sample was made and tested as in Example 1-3. Results are reported in Table 1. Measured border widths were 1.43, 0.61, 0.39 and 0.77 mm.

Example 1-5

A sample was made as in Example 1-1. The environmental testing was high temperature-high humidity (HTHH) testing. Edge part curl was measured before environmental testing and following reconditioning. Results are reported in Table 1. Border widths were 0.41, 0.60, 1.17 and 0.91 mm.

Example 1-6

Another sample was made and tested as in Example 1-5. Results are reported in Table 1. Measured border widths were 0.95, 0.96, 0.68 and 0.55 mm.

Example 2-1

A sample was prepared as follows. Using a rotary converting process a stack of films was assembled. The bottom film was a 1 mil (25 micron) thick PET protective sheet of dimensions 65 mm by 115 mm with a 10 micron thick transfer adhesive (3M 84401 adhesive from 3M Company, St. Paul Minn.) applied to one side. Next, a sheet of SS400P0 (from GrafTech International Holdings, Independence Ohio,) was positioned with the graphite film facing the lower film and leaving about a 1 mm border around the perimeter. (The SS400P0 sheet had dimensions approximately 64 mm by 114 mm.) Next a second adhesive layer (also 10 micron thick 3M 84401 adhesive) was applied over the SS400P0 sheet. Then a 65 micron thick reflective film (ESR from 3M Company) having the same dimensions as the bottom PET sheet was attached above the graphite film with the reflective side facing away from the graphite film.

Edge part curl of the sample was evaluated before environmental testing and after reconditioning. The environmental test was thermal shock (TS) testing. The visual appearance of the sample was evaluated after reconditioning. Results are recorded in Table 1.

Example 2-2

A second sample was made and tested as in Example 2-1. Results are recorded in Table 1.

Example 2-3

A sample was made as in Example 2-1, but tested using the high temperature (HT) test. Results are recorded in Table 1.

Example 2-4

A second sample was made and tested as in Example 2-3. Results are recorded in Table 1.

Example 2-5

A sample was made as in Example 2-1, but tested using the high temperature, high humidity (HTHH) test. Results are recorded in Table 1.

Example 2-6

A second sample was made and tested as in Example 2-5. Results are recorded in Table 1.

Example 3-1

A sample was prepared as follows. Using a rotary converting process a stack of three films was assembled. The bottom film was a 1 mil (25 micron) thick PET protective sheet of dimensions 65 mm by 115 mm with a 10 micron thick transfer adhesive (3M 84401 adhesive) applied to one side. Next, 25 micron thick graphite sheet (from AvCarb Material Solutions, Lowell Mass.) was positioned on the lower film so that it left about a 1 mm border around the perimeter. (The graphite sheet had dimensions approximately 64 mm by 114 mm.) 3M 84401 adhesive (10 microns thick) was applied over the graphite film, and then a 65 micron thick reflective film (ESR from 3M Company, St. Paul Minn.) having the same dimensions as the bottom PET sheet was attached to the graphite film with the reflective side facing away from the graphite film.

Edge part curl of the sample was evaluated before environmental testing and after reconditioning. The environmental test was thermal shock (TS) testing. The visual appearance of the sample was evaluated after reconditioning. Results are recorded in Table 1.

Example 3-2

A second sample was made and tested as in Example 3-1. Results are reported in Table 1.

Example 3-3

A sample was made as in Example 3-1, but tested using the high temperature (HT) test. Results are recorded in Table 1.

Example 3-4

A second sample was made and tested as in Example 3-3. Results are reported in Table 1.

Example 3-5

A sample was made as in Example 3-1, but tested using the high temperature, high humidity (HTHH) test. Results are recorded in Table 1.

Example 3-6

A second sample was made and tested as in Example 3-5. Results are reported in Table 1.

Example 4-1

A sample was prepared as follows. Using a rotary converting process a stack of four films was assembled. The bottom film was a 2 micron thick PET protective sheet of dimensions 65 mm by 115 mm with a 5 micron thick transfer adhesive (3M 82600 adhesive) applied to one side. Next, a 40 micron thick graphite sheet with a protective tape (SS400P0 from GrafTech International Holdings, Independence Ohio) was positioned on the lower film so that it left about a 1 mm border around the perimeter of the graphite sheet (The graphite sheet had dimensions approximately 64 mm by 114 mm). Next a 65 micron thick reflective film (ESR from 3M Company, St. Paul Minn.) having the same dimensions as the bottom PET sheet was attached above the second protective sheet with the reflective side facing away from the graphite film. It was held in place by the adhesive around the border of the graphite film.

Edge part curl of the sample was evaluated before environmental testing and after reconditioning. The environmental test was high temperature (HT) testing. The visual appearance of the sample was evaluated after reconditioning. Results are recorded in Table 1.

Example 4-2

A second sample was made and tested as in Example 4-1. Results are recorded in Table 1.

Example 4-3

A third sample was made and tested as in Example 4-1. Results are recorded in Table 1.

Example 4-4

A sample was made as in Example 4-1 but tested using thermal shock (TS) testing. Results are recorded in Table 1.

Example 4-5

A second sample was made and tested as in Example 4-4. Results are recorded in Table 1.

Example 4-6

A third sample was made and tested as in Example 4-4. Results are recorded in Table 1.

Example 5-1

A sample was prepared as follows. Using a rotary converting process a stack of three films was assembled. The bottom film was a 65 micron thick reflective film (ESR from 3M Company) of dimensions 65 mm by 115 mm with a 5 micron thick adhesive (3M 84400 adhesive) applied to the non-reflective side. Next, a 40 micron thick graphite sheet with a protective tape (SS400P0 from GrafTech International Holdings, Independence Ohio) was positioned on the lower film so that it left about a 1 mm border around the perimeter of the graphite sheet. (The graphite sheet had dimensions approximately 64 mm by 114 mm.) Next an 80 micron thick reflective film (ESR80v2 from 3M Company) having the same dimensions as the bottom ESR sheet was attached above the graphite sheet (again using 5 micron thick 3M 84400 adhesive) with the reflective side facing away from the graphite film.

Edge part curl of the sample was evaluated before environmental testing and after reconditioning. The environmental test was thermal shock (TS) testing. The visual appearance of the sample was evaluated after reconditioning. Results are recorded in Table 1.

Example 5-2

A second sample was prepared and tested as in Example 5-1. Results are recorded in Table 1.

Example 5-3

A sample was prepared as in Example 5-1, but tested using the high temperature (HT) test. Results are recorded in Table 1.

Example 5-4

A second sample was prepared and tested as in Example 5-3. Results are recorded in Table 1.

Example 5-5

A sample was prepared as in Example 5-1, but tested using the high temperature-high humidity (HTHH) test. Results are recorded in Table 1.

Example 5-6

A second sample was prepared and tested as in Example 5-5. Results are recorded in Table 1.

TABLE 1

| Example | Environmental Test Condition | Change in average edge part curl (mm) | Visual appearance rating |
|---|---|---|---|
| Example 1-1 | TS | 0.25 | Good |
| Example 1-2 | TS | 0.5 | Good |
| Example 1-3 | HT | 0.625 | Excellent |
| Example 1-4 | HT | −0.125 | Excellent |
| Example 1-5 | HTHH | 3.25 | Good |
| Example 1-6 | HTHH | 1.75 | Good |
| Example 2-1 | TS | 13.5 | Marginal |
| Example 2-2 | TS | 14.5 | Marginal |
| Example 2-3 | HT | 14 | Marginal |
| Example 2-4 | HT | 14 | Marginal |
| Example 2-5 | HTHH | −1.5 | Marginal |
| Example 2-6 | HTHH | −1.5 | Marginal |
| Example 3-1 | TS | 15 | Excellent |
| Example 3-2 | TS | 16.25 | Excellent |
| Example 3-3 | HT | 3.25 | Excellent |
| Example 3-4 | HT | 2.125 | Excellent |
| Example 3-5 | HTHH | 2.75 | Excellent |
| Example 3-6 | HTHH | 4 | Excellent |
| Example 4-1 | HT | −3.5 | Good |
| Example 4-2 | HT | 1.75 | Good |
| Example 4-3 | HT | −1.5 | Good |
| Example 4-4 | TS | −5.5 | Good |
| Example 4-5 | TS | −3.25 | Good |
| Example 4-6 | TS | −4 | Good |
| Example 5-1 | TS | 1.5 | Marginal |
| Example 5-2 | TS | 3 | Marginal |
| Example 5-3 | HT | 1.75 | Marginal |
| Example 5-4 | HT | 3.25 | Marginal |
| Example 5-5 | HTHH | 2 | Marginal |
| Example 5-6 | HTHH | 3 | Marginal |

The following are exemplary embodiments according to the present disclosure:

Item 1

A reflective stack, comprising:
a first polymeric multilayer reflector having a major surface;
a heat spreading layer disposed on the major surface of the polymeric multilayer reflector; and
a second polymeric multilayer reflector disposed on the heat spreading layer opposite the first polymeric multilayer reflector;
wherein the first polymeric multilayer reflector has a first thickness and the second polymeric multilayer reflector has a second thickness, and the first thickness and the second thickness are within 5% of each other.

Item 2

A reflective stack, comprising:
a polymeric multilayer reflector having a major surface;
a heat spreading layer having at least one edge, the heat spreading layer disposed on the major surface of the polymeric multilayer reflector; and a polymeric film disposed on the heat spreading layer opposite the polymeric multilayer reflector;

wherein the polymeric multilayer reflector and the polymeric film are larger than the heat spreading layer such that, from a plan view, there is at least a 0.1 mm border along a portion of the at least one edge that includes the polymeric multilayer reflector and the polymeric film but no heat spreading layer; and wherein the polymeric film is adhered directly to the polymeric multilayer reflector at the border.

Item 3

The reflective stack of item 2, wherein the at least one edge includes four edges, and, from a plan view, there is at least a 0.1 mm border along two of the four edges that includes the polymeric multilayer reflector and the polymeric film but no heat spreading layer.

Item 4

The reflective stack of item 3, wherein, from a plan view, there is at least a 0.1 mm border along three of the four edges that includes the polymeric multilayer reflector and the polymeric film but no heat spreading layer.

Item 5

The reflective stack of item 2, wherein the heat spreading layer is not adhered to the major surface of the polymeric multilayer reflector.

Item 6

The reflective stack of item 2, wherein the heat spreading layer is adhered to the major surface of the polymeric multilayer reflector.

Item 7

The reflective stack of item 2, wherein the heat spreading layer is adhered to the polymeric film.

Item 8

The reflective stack of item 2, wherein the heat spreading layer includes natural graphite.

Item 9

The reflective stack of item 2, wherein the heat spreading layer includes synthetic graphite.

Item 10

The reflective stack of item 2, wherein the heat spreading layer includes copper.

Item 11

A backlight, comprising the reflective stack of item 2.

Item 12

A display, comprising the reflective stack of item 2.

Item 13

A reflective stack, comprising:
a polymeric multilayer reflector having a major surface;
a first polymeric film disposed on the major surface of the polymeric multilayer reflector;
a heat spreading layer having at least one edge, the heat spreading layer disposed on first polymeric film opposite the polymeric multilayer reflector; and a second polymeric film disposed on the heat spreading layer opposite the polymeric multilayer reflector;

wherein the polymeric multilayer reflector and the second polymeric film are larger than the heat spreading layer such that, from a plan view, there is at least a 0.1 mm border along a portion of the at least one edge that includes the polymeric multilayer reflector and the polymeric film but no heat spreading layer; and wherein the second polymeric film is adhered directly to the polymeric multilayer reflector at the border.

Item 14

The reflective stack of item 13, wherein the first polymeric film is disposed such that it is closer to the second polymeric film than the polymeric multilayer reflector.

Item 15

The reflective stack of item 13, wherein the first polymeric film is disposed such that it is closer to the second polymeric film than the polymeric multilayer reflector.

Item 16

The reflective stack of item 13, wherein at least one of the first polymeric film or the second polymeric film has at least one perforation.

Item 17

The reflective stack of item 13, wherein the at least one edge includes four edges, and, from a plan view, there is at least a 0.1 mm border along two of the four edges that includes the polymeric multilayer reflector and the second polymeric film but no heat spreading layer.

Item 18

The reflective stack of item 17, wherein, from a plan view, there is at least a 0.1 mm border along three of the four edges that includes the polymeric multilayer reflector and the polymeric film but no heat spreading layer.

Item 19

The reflective stack of item 13, wherein the heat spreading layer includes graphite.

Item 20

A roll of film, comprising:
a plurality of reflective stacks as in item 13;
wherein between two adjacent reflective stacks of the plurality of reflective stacks, the second polymeric film is continuous but the polymeric multilayer reflector is discontinuous.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A reflective stack, comprising:
a polymeric multilayer reflector having a major surface;
a heat spreading layer having at least one edge, the heat spreading layer disposed on the major surface of the polymeric multilayer reflector; and
a polymeric film disposed on the heat spreading layer opposite the polymeric multilayer reflector;
wherein the polymeric multilayer reflector and the polymeric film are larger than the heat spreading layer such that, from a plan view, there is at least a 0.1 mm border along a portion of the at least one edge that includes the polymeric multilayer reflector and the polymeric film but no heat spreading layer; and
wherein the polymeric film is adhered directly to the polymeric multilayer reflector at the border.

2. The reflective stack of claim 1, wherein the at least one edge includes four edges, and, from a plan view, there is at least a 0.1 mm border along two of the four edges that includes the polymeric multilayer reflector and the polymeric film but no heat spreading layer.

3. The reflective stack of claim 2, wherein, from a plan view, there is at least a 0.1 mm border along three of the four edges that includes the polymeric multilayer reflector and the polymeric film but no heat spreading layer.

4. The reflective stack of claim 1, wherein the heat spreading layer is not adhered to the major surface of the polymeric multilayer reflector.

5. The reflective stack of claim 1, wherein the heat spreading layer is adhered to the major surface of the polymeric multilayer reflector.

6. The reflective stack of claim 1, wherein the heat spreading layer is adhered to the polymeric film.

7. The reflective stack of claim 1, wherein the heat spreading layer includes natural graphite.

8. The reflective stack of claim 1, wherein the heat spreading layer includes synthetic graphite.

9. The reflective stack of claim 1, wherein the heat spreading layer includes copper.

10. A backlight, comprising the reflective stack of claim 1.

11. A display, comprising the reflective stack of claim 1.

12. A reflective stack, comprising:
a polymeric multilayer reflector having a major surface;
a first polymeric film disposed on the major surface of the polymeric multilayer reflector;
a heat spreading layer having at least one edge, the heat spreading layer disposed on first polymeric film opposite the polymeric multilayer reflector; and
a second polymeric film disposed on the heat spreading layer opposite the polymeric multilayer reflector;
wherein the polymeric multilayer reflector and the second polymeric film are larger than the heat spreading layer such that, from a plan view, there is at least a 0.1 mm border along a portion of the at least one edge that includes the polymeric multilayer reflector and the polymeric film but no heat spreading layer; and
wherein the second polymeric film is adhered directly to the polymeric multilayer reflector at the border.

13. The reflective stack of claim 12, wherein the first polymeric film is disposed such that it is closer to the second polymeric film than the polymeric multilayer reflector.

14. The reflective stack of claim 12, wherein at least one of the first polymeric film or the second polymeric film has at least one perforation.

15. The reflective stack of claim 12, wherein the at least one edge includes four edges, and, from a plan view, there is at least a 0.1 mm border along two of the four edges that includes the polymeric multilayer reflector and the second polymeric film but no heat spreading layer.

16. The reflective stack of claim 15, wherein, from a plan view, there is at least a 0.1 mm border along three of the four edges that includes the polymeric multilayer reflector and the polymeric film but no heat spreading layer.

17. The reflective stack of claim 12, wherein the heat spreading layer includes graphite.

18. A roll of film, comprising:
a plurality of reflective stacks as in claim 12;
wherein between two adjacent reflective stacks of the plurality of reflective stacks, the second polymeric film is continuous but the polymeric multilayer reflector is discontinuous.

* * * * *

UNITED STATES PATENT AND TRADEMARK OFFICE
CERTIFICATE OF CORRECTION

PATENT NO. : 11,125,921 B2  Page 1 of 1
APPLICATION NO. : 15/747404
DATED : September 21, 2021
INVENTOR(S) : Clint Jones et al.

It is certified that error appears in the above-identified patent and that said Letters Patent is hereby corrected as shown below:

In the Claims

Column 16
Line 9 (approx.), In Claim 12, before "first", insert --the--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*